US005620274A

United States Patent [19]
Wear

[11] Patent Number: 5,620,274
[45] Date of Patent: Apr. 15, 1997

[54] MOBILE SUSPENSION DEVICE

[76] Inventor: Stuart C. W. Wear, 8216 30 1/2 St. #109, St. Louis Park, Minn. 55426

[21] Appl. No.: 607,290

[22] Filed: Feb. 26, 1996

[51] Int. Cl.⁶ .................................................. A63H 33/42
[52] U.S. Cl. .............................. 403/171; 403/217; 403/3; 403/2; 446/227; 40/617
[58] Field of Search .............................. 446/227; 84/83, 84/87, 402, 406; 116/141; 40/617; 403/2, 3, 171, 217, 170, 218

[56] References Cited

U.S. PATENT DOCUMENTS

| 1,096,806 | 5/1914 | Herbert | 403/3 X |
|---|---|---|---|
| 2,506,001 | 5/1950 | Sturman | 446/227 X |
| 2,994,156 | 8/1961 | Steiner et al. | 446/227 |
| 3,161,930 | 12/1964 | Crosson | 403/3 |
| 3,294,053 | 12/1966 | Emery, Jr. | 403/362 X |
| 4,223,932 | 9/1980 | Gonsalves | 403/3 X |
| 4,281,562 | 8/1981 | Venuto | 403/4 X |
| 4,557,513 | 12/1985 | Ferrieri | 403/3 X |
| 4,567,682 | 2/1986 | Hurxthal | 40/617 |
| 4,987,639 | 1/1991 | Baiuley et al. | 403/2 X |

Primary Examiner—Anthony Knight
Attorney, Agent, or Firm—Leo Gregory

[57] ABSTRACT

A mobile suspension arrangement having a central member adapted to frictionally hold in suspension extended wires having related clip members frictionally engaging the wire ends and hanging strings for suspending mobiles.

6 Claims, 2 Drawing Sheets

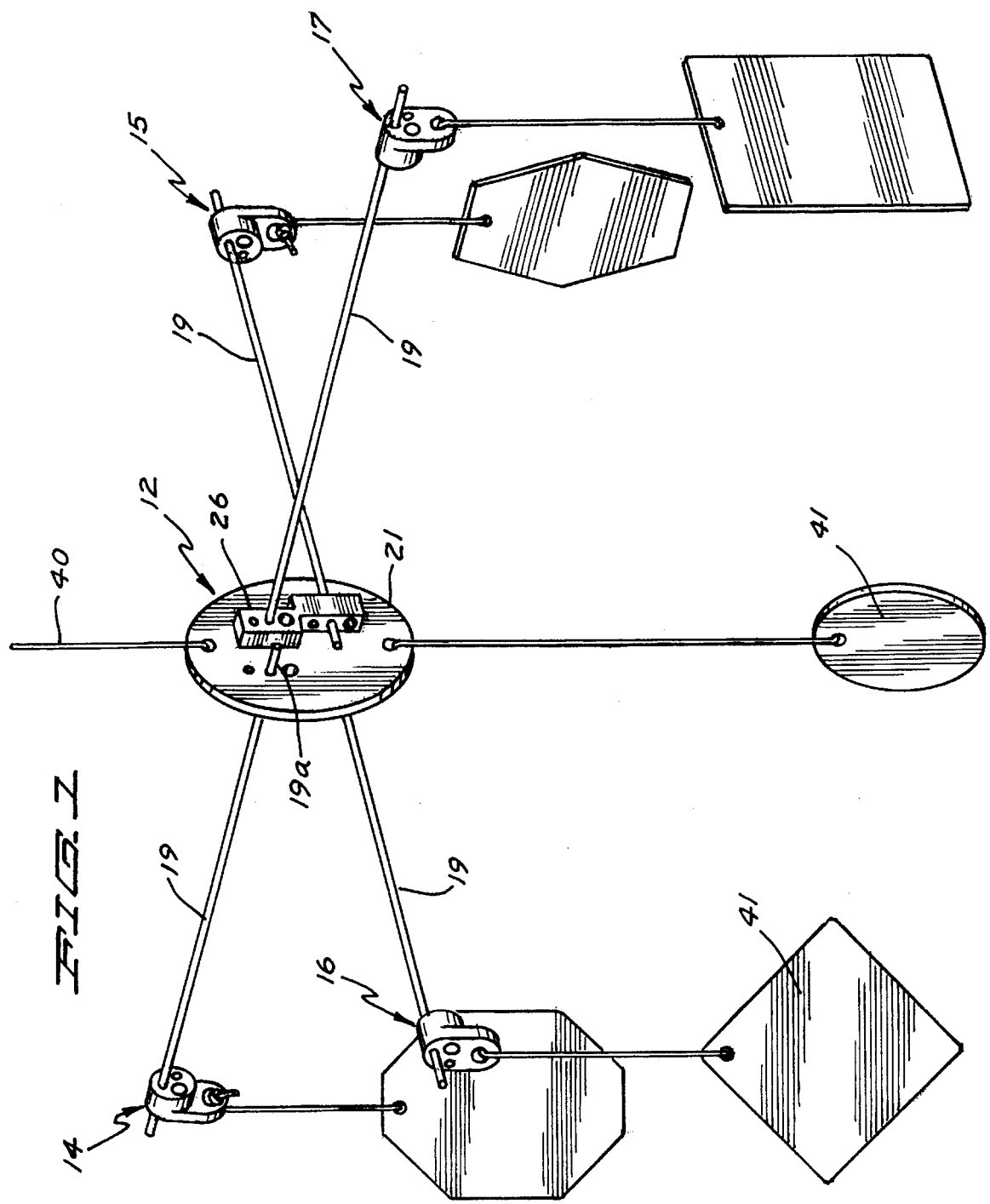

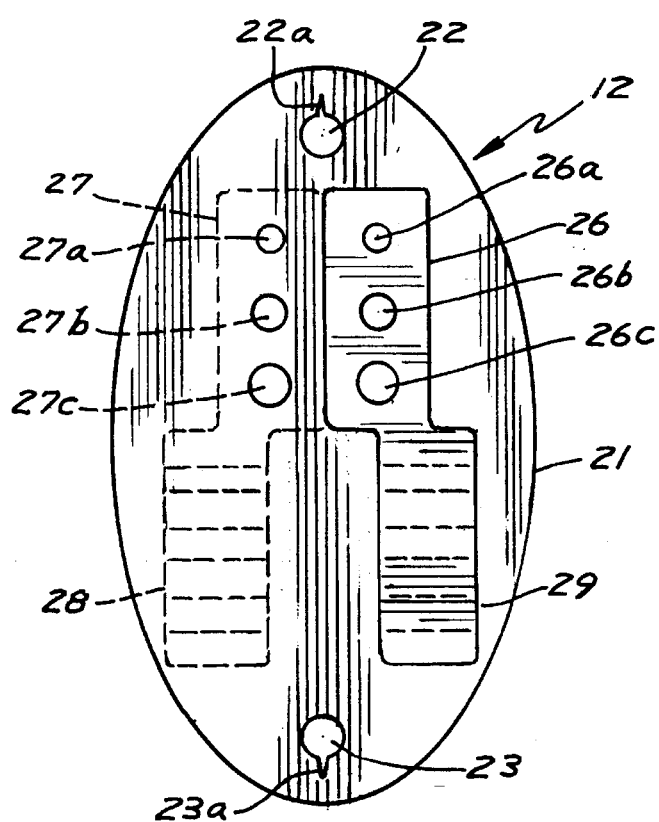
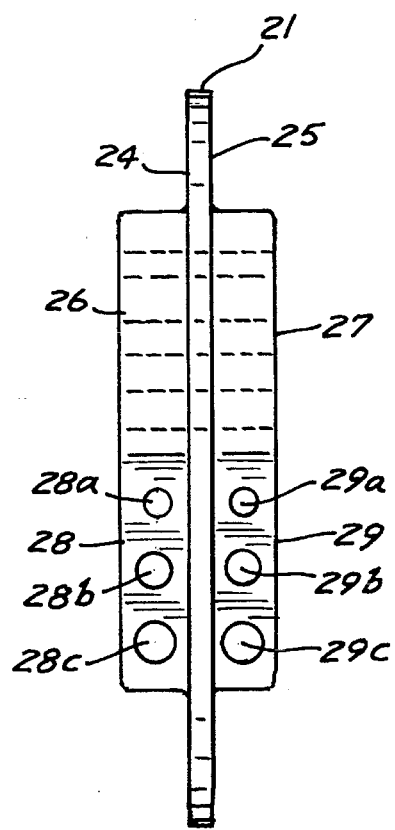
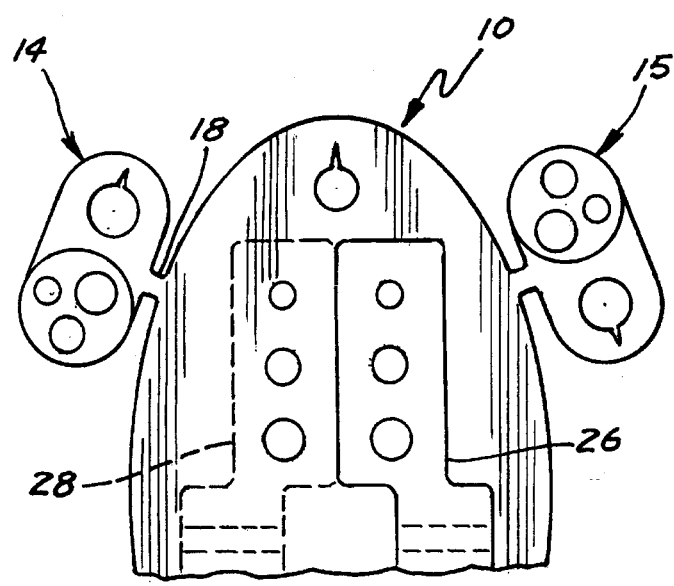
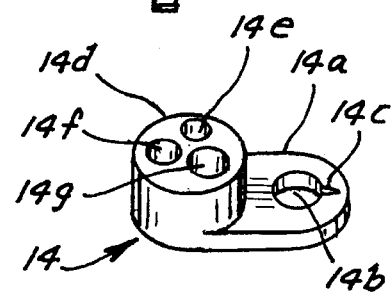
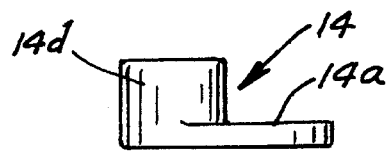

MOBILE SUSPENSION DEVICE

BACKGROUND OF THE INVENTION

1. Field of the Invention

This invention is in the field of mobiles and especially in devices or arrangements for hanging mobiles.

2. Description of the Prior Art

In the use of mobiles, in general a block of wood with holes drilled in it to receive wires to be supported therein is used. String is commonly tied to the wires. However, string tends to slip off of wires or the wire itself may have looped ends and string for hanging mobiles would have to be tied to the wire loops.

The bending of loops in the wire ends is relatively expensive as is the time required to tie on the strings.

The object herein is to simplify and improve the hanging of mobiles.

SUMMARY OF THE INVENTION

The invention herein provides a central wire holder and wire end clips which represent significant improvement in mobile suspension members.

It is a principal object to provide a central or core holding member having various sized holes therein to frictionally receive and secure therein wires of various diameters such as are commonly in use.

It is another object to provide end wire clips having various sized holes therein to be frictionally received and be secured to wire ends and to have mobiles suspended therefrom.

It is a further object to have narrowing slit notches in said core member's and end clips for frictional engagement by string suspension members. Beaded or barbed, string as Well, as plain string will have frictional engagement in said notches.

It is still another object herein to have a central holding member having integral therewith by separable linkage end clip members having operable association with said holding member.

These and other objects and advantages of the invention will be set forth in the following description made in connection with the accompanying drawings in which like reference numerals refer to similar parts throughout the several views.

BRIEF DESCRIPTION OF THE DRAWINGS

FIG. 1 is a perspective view showing the invention herein in operating positions;

FIG. 2 is a view in front elevation of a central hanging device;

FIG. 3 is a view of FIG. 2 in side elevation;

FIG. 4 is a perspective view of a suspension element;

FIG. 5 is a view of FIG. 4 in side elevation; and

FIG. 6 is a broken view in elevation showing the formation of the invention herein.

DESCRIPTION OF A PREFERRED EMBODIMENT

Referring to the Figures and particularly to FIG. 1, shown in operating position is the invention herein comprising as arrangement for the suspension of mobiles including a central member 12 with associated clip members 14–17 and the connective wire extensions Referring to FIG. 6, the invention indicated generally by the numeral 10 is shown in a formative stage in which it is produced by a molding process in which the central member 12 has integral therewith said clip members 14–17 of which in this broken view only 14 and 15 are shown. The clip members are thus conveniently formed with the central member and are detached for separated related use by a mere twist to break their connecting linkage 18.

Referring now to FIGS. 2 and 3, said central member 12 is shown basically formed of a fairly thin oval plate member 21 having apertures 22 and 23 adjacent the ends thereof, said apertures respectively having narrowing slits 22a and 23a extending outwardly towards the ends of said member 21. Said plate member 22 has opposed outward facing sides 24 and 25.

Said side 24 has outwardly extending projections 26 and 27 and said side 25 has like outwardly extending projections 28 and 29.

The projections are each here shown to be parallelepiped in form. The oppositely facing projections 26 and 27 are respectively adjacent transversely on the opposite outward facing sides of said central member 21. Said projections are each shown to have a set of three holes disposed at right angles to said member 21, said holes being respectively 26a, b and c and 27a, b and c, each of these holes having a different diameter.

Positioned below said projections 26 and 27 but spaced transversely apart are the projections 28 and 29. Each of these projections has a set of three holes extending therethrough in a direction parallel to said central member 21.

Said sets of holes are particularly adapted to receive therein fairly rigid extension wires 19 from which mobiles generally hang. Said wires are identical and are of diameters which will fairly coincide with the diameter of one of the holes in said sets of holes for secure frictional engagement therein.

In operational arrangement with said central member 12 are said clip members 14–17 of which clip member 14 will be described representative of all of the clips.

Said clip 14, with reference to FIGS. 4 and 5, here comprising an elongated oval plate-like body portion 14a having an aperture 14b spaced from one end thereof, said aperture having an elongated narrowing slit 14c extending outwardly thereof towards said end of said body portion.

A cylindrical projection 14d extends upwardly of the other end of said clip, the same having, as here shown, three holes therethrough 14e, f and g of three different diameters being the same as the holes 26a, b and c.

Referring particularly to FIG. 1, the central member 12 is shown held suspended by a string 40 which is secured in the slit 22a.

The wires 19 have their respective end portions 19a frictionally securely engaged in the appropriately sized holes of said clip members 14–16. Hanging by strings 40 from said clip members are mobiles 41, said strings being secured in the respective slits of said clip members.

Said wires 19 are readily adjusted as to their extended length by merely sliding the same through the respective holes in which they are held. The mobiles in like manner are readily adjusted as to their hanging length by merely lifting and shifting the string of each in its respective slit.

This is all a very substantial improvement over the prior art usage such as of looping ends of wires and tying strings to said loops.

It will, of course, be understood that various changes may be made in the form, details and arrangement of the device comprising the invention herein without departing from the scope of the invention as discussed and defined in the appended claims.

What is claimed is:

1. A suspension arrangement for mobiles, comprising a central holding member having a top and bottom end, a plurality of sets of holes in said member, said holes of each of said sets each having a different diameter adapted to receive a wire therethrough having a frictional holding engagement therewith, said wires extending outwardly thereof, plurality of clip members, each clip member having a set of a plurality of holes with each of said holes having a different diameter, said clip members respectively being adapted to be positioned at the outer extended ends of the wires extending from said holes in said central holding member, having frictional engagement therewith, each of said clip members having a hole therethrough having an outwardly extending narrowing slit, whereby said clip members are disposed at the ends of wires extending from said central member having string suspended mobiles and said central member is suitably hung suspended.

2. The structure of claim 1, wherein said central member being formed of an elongated plate member having out facing sides, sets of said holes of said member extend through said central members at right angles to the sides thereof, and sets of said holes of said member being adapted to extend parallel to the sides of said member at opposite sides thereof.

3. The structure of claim 1, wherein said central member being formed of an elongated plate member having outfacing sides, a projection at an upper portion of each of said sides in an opposed side by side relation, a set of said holes of said member in each of said projections, said projections having such a thickness as to provide a sufficient length passage in said holes to secure wire ends therein, said holes being at right angles to said outfacing sides of said central member, a projection at a lower portion of each of said sides in an opposed transversely spaced apart relation, and a set of said holes of said member in each of said last mentioned projections having passages therein parallel to the outfacing sides of said member.

4. The structure of claim 1, wherein said clip members each comprising an oval platelike body portion having a portion thereof projecting at right angles to said body portion, and a set of holes of each of said clip members extending through said body portion.

5. a suspension arrangement for mobiles, comprising a central holding member formed as a molded product, a plurality of clip members integral with said central holding member by linkage attachments suspending mobiles; and said linkage being separable.

6. A central holding member comprising means adapted to frictionally engage wires of varying diameters, a plurality of clip members, said clip members respectively being adapted to frictionally engage ends of said wires, and said central holding member and said clip members being adapted to frictionally hold suspended strings.

* * * * *